(12) United States Patent
Natbony

(10) Patent No.: US 10,896,475 B2
(45) Date of Patent: Jan. 19, 2021

(54) ONLINE DELIVERY OF LAW-RELATED CONTENT, EDUCATIONAL AND ENTERTAINMENT-RELATED CONTENT

(71) Applicant: Suzanne Raina Natbony, Los Angeles, CA (US)

(72) Inventor: Suzanne Raina Natbony, Los Angeles, CA (US)

( * ) Notice: Subject to any disclaimer, the term of this patent is extended or adjusted under 35 U.S.C. 154(b) by 384 days.

(21) Appl. No.: 15/184,059

(22) Filed: Jun. 16, 2016

(65) Prior Publication Data

US 2016/0371802 A1 Dec. 22, 2016

Related U.S. Application Data

(60) Provisional application No. 62/180,119, filed on Jun. 16, 2015.

(51) Int. Cl.
*G06Q 50/18* (2012.01)
*H04L 29/08* (2006.01)
*H04L 29/06* (2006.01)

(52) U.S. Cl.
CPC ......... *G06Q 50/18* (2013.01); *H04L 65/4084* (2013.01); *H04L 65/4092* (2013.01); *H04L 65/60* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2006/0195430 A1* | 8/2006 | Arumainayagam | ......................... G06F 17/30011 |
| 2007/0094275 A1* | 4/2007 | Fanning | ................... H04L 29/06 |
| 2011/0212430 A1* | 9/2011 | Smithmier | ............... G09B 7/00 434/322 |
| 2011/0213806 A1* | 9/2011 | Zuber | ..................... G06F 16/93 707/784 |

FOREIGN PATENT DOCUMENTS

JP 2005094709 A * 4/2005

OTHER PUBLICATIONS

Phillips, Edward, Legal Education: Simulation in Theory and Practice, Ashgate Publishing Ltd., Dec. 28, 2014 (Year: 2014).*
Carter, Sean, If It Does Not Fit, Must You Acquit?: Your Humorous Guide to the Law, Lawpsided Press, Sep. 13, 2002 (Year: 2002).*
Silvia Pfeiffer, Abstracting Digital Movies Automatically, 1996, University of Mannheim, pp. 1-16 (Year: 1996).*

* cited by examiner

*Primary Examiner* — Minnah L Seoh
*Assistant Examiner* — Michael Young

(57) ABSTRACT

The present invention provides improved online delivery of law-related content. The present invention also has broad applicability within the technology and media fields and can also be utilized for the improved online delivery of educational content and entertainment-related content.

2 Claims, 2 Drawing Sheets

ONLINE DELIVERY OF LAW-RELATED CONTENT, EDUCATIONAL AND ENTERTAINMENT-RELATED CONTENT

PRIORITY CLAIM

This U.S. Utility Patent Application herein claims priority to U.S. Provisional Patent Application Ser. No. 62/180,119, filed Jun. 16, 2015. This invention was not created using federal funds.

FIELD OF THE INVENTION

The present invention generally relates to improved online delivery of law-related content for users. The present invention also has broad applicability within the technology and media fields and can also be utilized for the improved online delivery of educational content and also entertainment-related content.

BACKGROUND OF THE INVENTION

In today's modern society, people need and want affordable, accurate, reliable, easily-accessible and cost-effective information to answer their legal questions. People also want easily accessible educational content and entertainment-related content. Moreover, in today's modern society, more and more people use online services (e.g., via the Internet) for many services and to gather information. Although some attempts have been made to provide online law-related content, including answers to people's legal questions, conventional approaches leave users very dissatisfied because of the high costs, poor service, unreliable service, and general poor quality of these other sites. Often times, conventional online sites and sources of information that allege to provide help for people's legal questions are very difficult to navigate. Also, conventional providers of law-related content are not that appealing to users, and especially to users in younger demographic groups, because the law-related material is very difficult to understand, especially for younger people. No other conventional provider of law-related content has offered content in a manner such that the content is provided by actual licensed attorneys, and wherein the law-related content is also provided in a manner that is very educational, entertaining and therefore appealing to watch, all in the same platform.

There has therefore been a long-felt, significant and un-met need for significantly improved delivery of cost-effective online law-related content. The present invention satisfies this long standing need in the art. The present invention provides novel and non-obvious, cost-effective approaches, methods and systems for providing interactive legal content to a user or a plurality of users, and wherein the law-related content is also provided in a manner that is very educational and entertaining all in the same platform.

SUMMARY OF THE INVENTION

In one aspect of the present invention, the methods and systems for improved online delivery of law-related content are very cost-effective and provide for streaming videos that contain useful legal information.

In another aspect of the invention, the improved online delivery of law-related content of the present invention provides for computer methods and systems that allow a user to search a video for one or more audible terms.

In yet another aspect of the invention, the present invention provides for novel streaming video playback methods that allow much faster and more efficient playback, e.g., so that a viewer can listen to someone talk faster.

In yet another aspect of the invention, the present invention provides methods that enable a user to edit a document online as a user views a streaming video.

In yet another aspect of the invention, the present invention provides novel methods of aggregating law-related content, including third-party law-related content.

Still other objects and advantages of preferred embodiments of the present invention will become readily apparent to those skilled in this art from the following detailed description, wherein there is described certain preferred embodiments of the invention, and examples for illustrative purposes.

DESCRIPTION OF PREFERRED EMBODIMENTS

Although the following detailed description contains many specific details for the purposes of illustration, one of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the drawings and related descriptions, there is no intent to limit the scope to the embodiments disclosed herein. On the contrary, the intent is to cover all alternatives, modifications, and equivalents.

The terms "comprising," "having," and "including" are synonymous, unless the context dictates otherwise.

The present invention provides novel and non-obvious, cost-effective approaches, methods and systems for providing interactive law-related content and information to a user or a plurality of users, and wherein the law-related content is also provided in a manner that is very educational and entertaining all in the same platform.

In a preferred embodiment, the methods and systems of the present invention provide interactive, online law-related content and information to a user or a plurality of users in a very cost-effective manner. Users of the interactive, online system are not required to pay any lawyer for actual legal services. Instead, the cost-effective delivery of information via the interactive, online system includes streaming videos with useful legal information. Preferably, the system is designed to educate the public about the law in an entertaining and informative manner, by providing videos that feature licensed lawyers (e.g. "video instructors"). The video instructors offer educational discussions on legal issues that are well suited for any audience.

Figure 1:
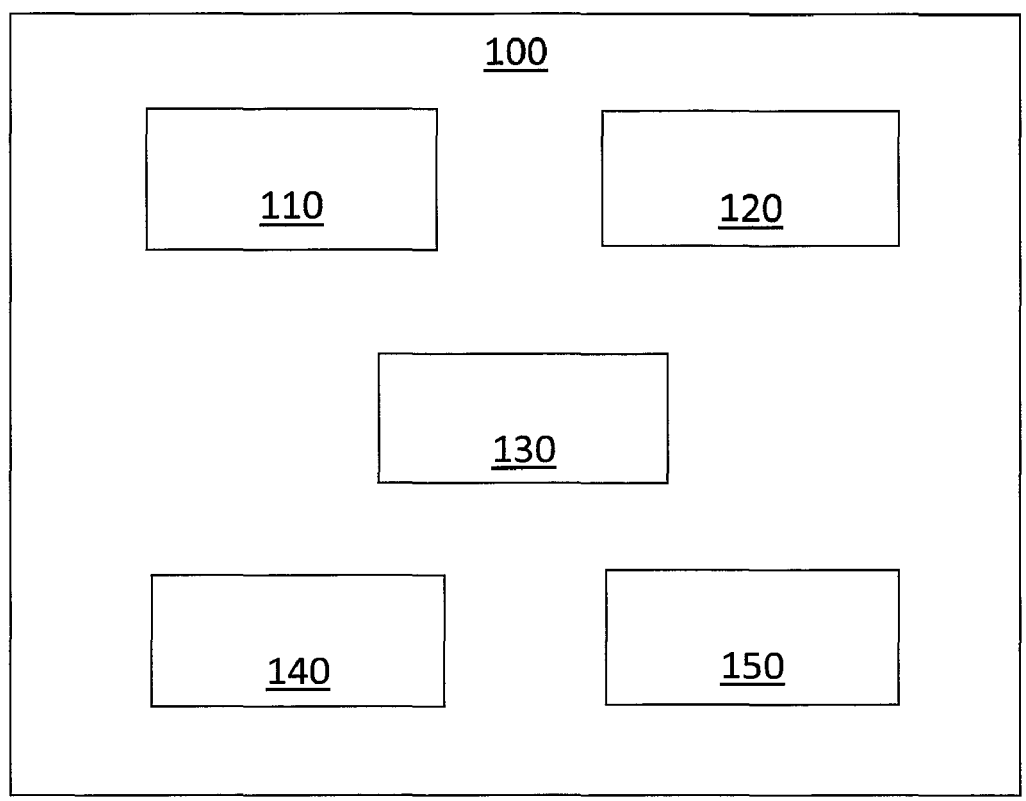
FIG. 1 depicts an exemplary, interactive system for providing interactive law-related content, wherein the system comprises a searching subsystem, a skimming subsystem, an editing subsystem, a video scrolling subsystem, and a content aggregation subsystem.

By way of non-limiting example, a representative system of the present invention is displayed schematically in FIG. 1 as an interactive, online system 100. By paying a subscription fee, users of the interactive, online system 100 can obtain educational legal materials and receive access to all the materials, data and information provided via the interactive, online system.

The interactive system 100 can preferably be accessed via an interactive website, and the videos, educational materials and other content provided through the interactive system 100 are made available to users or consumers via the website. As used herein, an "interactive website" means that a user can access information, contribute information, retrieve information, post and edit documents, and/or otherwise interact with content (wherein the content includes, but is not limited to, text, graphics, images, documents, audio files, video files, and other types of materials and files) in other ways that is provided by the interactive system 100 via the Internet. A user of the system 100, for instance upon payment of a subscription fee, can also optionally select certain additional features which can also be accessed via the website. Representative features include, but are not limited to, watching additional entertaining and educational law-related videos, accessing educational content, downloading educational forms and law-related forms, participating in a Q&A discussion (question-and-answer discussion) with other users and/or video instructors, posting content and searching for content on law-related blogs, skimming videos, searching one or more videos for one or more audible terms, scrolling through one Or more videos, and editing one or more documents online as a user views a streaming video, or any combination of these features. Other representative features which are provided via the interactive system 100 include, for example, access to legal news updates and/or case-related information which can be accessed by a user; access to a calendar of events for law-related, educational and entertaining events that may be of interest to a user; access to sample legal documents; access to a user "chat room" for exchanging comments and dialogue with other users of the interactive system; access to advertising by real-world attorneys and businesses; and a la carte products of interest, such as options for paid access to movies made in Hollywood, Calif., and paid access to other movies that feature actors or actresses acting as lawyers. In addition, the interactive system 100 can also preferably allow a user to provide feedback about their experience using the system 100, post questions, and also give ratings about the videos and other materials that they access via the system 100.

As used herein, a "user" is used synonymously with "consumer." According to one example, when a user has a legal issue or question, they can post their legal issue or question via the interactive system 100 which can preferably be accessed via an interactive website. In this manner, other users of the interactive system 100 can therefore view, comment on, reply to, and otherwise engage in dialogue in response to the posted legal issue or question.

When using the interactive system 100, a user can search for, and select from, any number of different legal topics and legal issues that they need help with, or have questions about. Preferably, the user can then access a free preview video with limited free content. By way of non-limiting example, the user has the option of paying a fee to download supplemental instructions and law-related forms, and optionally watch one or more entertaining "do-it-yourself" videos or educational videos on one or more law-related topics.

By way of non-limiting example, an entertaining "do-it-yourself" video or educational video is intended to refer to a video that can be accessed via the system 100, and features an audible dialogue between one or more video instructors and one or "mock clients", and further wherein the dialogue has been intentionally scripted (i.e. produced from a script) and contains humorous jokes as part of the dialogue, while at the same time providing educational law-related content that is helpful in answering the user's law-related questions. The "mock clients" are preferably real-world actors or actresses that are hired to appear in the video as clients that are seeking answers to their questions on one or more legal topics. The videos also preferably feature one or more entertaining and educational props and/or visual aids and one or more sound aids (e.g. background sounds or music that accompany the props and/or visual aids) that are also featured as part of the scripted video. It is preferred that the videos that are accessed via the system 100 are well-rehearsed, scripted, and edited videos that have been written, directed and produced by an experienced video production team, i.e. experience working with real-world actors and/or actresses with formal acting experience. This results in a video that is both educational and entertaining, and also very valuable in delivering accurate, highly informative law-related content to the users. By way of non-limiting example, representative law-related content that may be covered in the videos includes content on immigration law, intellectual property law, business formation, dispute resolution, and other areas of law.

Figure 2:
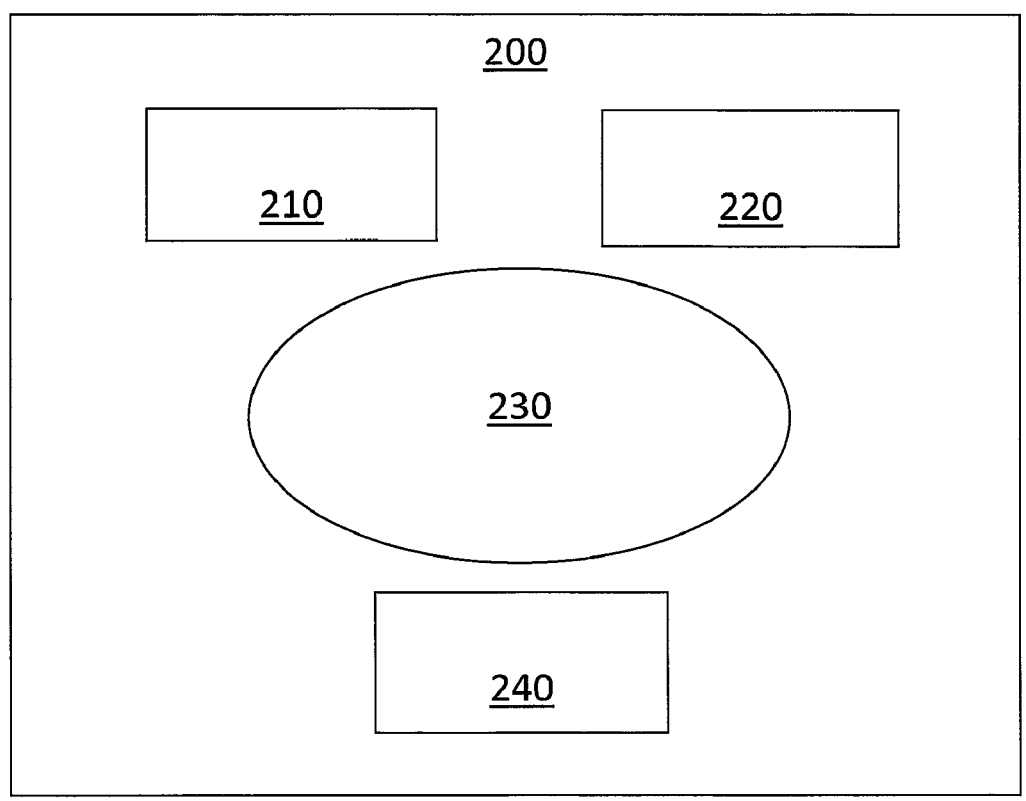
FIG. 2 depicts a representative, schematic scene from a video in which two video instructors are sitting around a table with a mock client.

Referring to FIG. 2, a representative, schematic scene from a video is shown, in which two video instructors are sitting around a table with a mock client. In this depiction, video instructors 210 and 220 are sitting around a table 230 and having a dialogue with mock client 240 about one or more law-related topics. The dialogue is videotaped and then the entire video can be viewed by a user. Preferably, the entire dialogue is rehearsed beforehand from a script. By way of example, during a dialogue, a mock client asks one or more video instructors general questions about immigration law. The video instructors are actual licensed attorneys that have a great deal of knowledge and real-world experience in the field of immigration law, and these attorneys appear in the video as video instructors for educational purposes. The video features a dialogue between the mock client and the video instructors, and the dialogue also preferably contains one or more entertaining anecdotes and jokes to make the video more entertaining for viewers. In this example, the information provided by the video instructors is also very educational and allows any viewer of the video to learn more about immigration law.

Preferably, a free one-minute to two-minute video can also be accessed via the system 100, and these free one-minute to two-minute videos have a "trailer", advertisement or short preview that includes a pitch from one of the video instructors which invites a user to view a lengthier video.

By way of example, monetization of the system 100 can preferably be achieved by having users pay a subscription fee to access full-length videos. Additional revenue may be obtained, for example, by advertising on the website.

The interactive system provides significant and unexpected advantages for users or consumers, because in today's global economy, many people simply cannot afford to hire an expensive lawyer, and many people need reliable, accurate, timely, and easily-accessible information to help their legal questions. The interactive system 100 of the present invention provides users with a low-cost, do-it-yourself option that allows users to educate themselves on different areas of the law. The interactive system 100 of the present invention enables users to reduce costs by allowing them to be better informed, and enables users to be better prepared to manage a legal task with an attorney, should the user decide to hire an actual attorney. The interactive system 100 is an easy-to-use interface that can run on any computer platform, wireless platform or other electronic platform (such as a smartphone, tablet, laptop or other similar device) and the system 100 can also provide both video content and audio content for users in any language. Representative languages include, but are not limited to, English, Mandarin, Japanese, French, German, Spanish, Korean, Italian, Russian, and any other language.

A user can access the interactive system 100 of the present invention, for example, via access to an Internet website via a personal computer or PC (not shown), or via access to any other type of electronic device, including but not limited to a laptop, tablet, or smartphone. The computer or other electronic device can be operated using any type of operating system including but not limited to, for example, any type of Linux®, Apple®, Android® or Windows® brand operating system. In preferred embodiments, the computer or other electronic device has a screen and a keyboard and the keyboard can, for example, be a physical keyboard, an onscreen virtual keyboard, or a "touch screen keyboard" (e.g. a keyboard that is accessed via touching the screen). The screen can also be a "touch screen" which allows the user to use the interactive system (e.g., select videos for viewing; submitting content for review by other users, etc) by touching the screen with either their fingers, a stylus, or by other means. The user can also preferably zoom in or zoom out to change the size of the videos when they are viewing them via the interactive system 100.

By way of non-limiting example, the interactive system 100 can include any number of hardware and software components that together provides a secure and reliable system which is operable for providing users with access to graphics, videos, law-related content, and other visual and audio content that is described herein, and which is made available to users of the system 100. By way of non-limiting example, hardware components can include, but are not limited to, a monitor, keyboard, hard disk drive, sound card, graphic cards, memory (RAM), motherboard, and computer data storage. The interactive system 100 can also include one or more speakers, and accompanying hardware and software components that allow a user to listen to audible components from a video. The interactive system 100 can also include a microphone and accompanying hardware and software components that allow a user to record his or her own audio input which, for instance, can be transcribed and allows the user to post law-related questions to one or more video instructors.

The audio and visual content that can be accessed via the interactive system 100 of the present invention can also be stored, accessed and retrieved using any secure and suitable storage means. The audio and visual content, for instance content included in video files, can also be stored on a computer's hard drive or networked drive. More preferably, a user can store data and files, such as video files, graphics, images, etc, on one or more remote data servers. A user can also use one or more remote web-based applications, for instance any suitable SaaS or "Software as a Service" application, to organize the data and files. A "cloud server" can also be utilized to store the files available on the interactive system 100, such as video files, graphics, images, etc, using any suitable cloud computing server architecture. These and other data-backup, server and storage technologies can be utilized in accordance with the present invention, such that users can safely and reliably upload any type of audio and video content, and other data and files to a server, such as a network server or cloud-based server.

Video files, for instance digital video files, can be stored using any suitable storage format. Preferably, the video files are stored in a compressed form. Audio files are also preferably stored in a compressed form. The video file preferably contains video data in a video coding format, and also contains audio data in an audio containing format. Lossy or lossless compression can be used to reduce the size of the file. Audio files and video files can also be uncompressed.

The interactive system 100, which can preferably be accessed via the interactive website, also preferably provides users with access to an electronic library of documents, forms and other resources that are useful in answering their questions on or more law-related topics.

In yet another preferred embodiment, the interactive system 100 allows a user to search a video for an audible term. For instance, referring to FIG. 1, interactive system 100 of the present invention includes a searching subsystem 110, which comprises reliable hardware and software components that enable a user to search a video for one or more audible terms. For example, if a user of the system 100 wants to learn about finder fees, the viewer can type "finder fee" into the computer and then, when a video instructor says "finder" or "finders," the video would start playing at that point, then the viewer could skip ahead to the next point of the video in which someone says finder fee and so forth.

The searching subsystem 110 comprises any combination of hardware and software components that enable a user to search a video for one or more audible terms. The searching subsystem 110 can be used to search for audible content, in addition to searching for any other type of content including text, graphics, images, etc. Any suitable search engine technology can be utilized that enables a user to search a video for desired content. Any suitable type of search engine can be used to search a video for an audible term. An "audio search engine" can be used, for example, to search a video for audio content. A search engine can search for different audio file characteristics such as type of audio file, length and duration of the audio file, voice characteristics of a specific individual (e.g. using voice recognition technology), frequency, pitch, loudness, harmonics, and tone, as well as any unique aspects of someone's voice. Other voice characteristics can also be searched including a particular individual's talking, laughing, etc. If a video also contains one or more musical elements or songs, then other audible components that can be searched include audible elements of the music or song that can be identified based on one or more features, including but not limited to notes on the musical scale, pitch, melody, tone, rhythm, tempo and dynamics. Speech technology can be used to recognize certain audible elements that are spoken in an audio or video file. Moreover, audio mining search technologies can be utilized to locate certain words, phrases and other audible terms within the audio. For example, audio mining searches can be run at speeds that are thousands of times faster than real time. In this manner, large quantities of audible content can be searched in a relatively short time. For instance, an audible dialogue during a video between video instructors and a mock client can be searched to locate certain audible terms.

In a preferred embodiment, the system 100 of the present invention also includes means for browsing a file for one or more audible terms. The means can include, for instance, a "browse audio" or "search audio" button or tab which is displayed when the user launches the system on their computer. A user can search for any audible term, or a plurality of audible terms.

The present invention also provides for streaming video playback methods that allow swifter and more efficient playback, e.g., so that a viewer can listen to someone talk faster. The invention therefore better enables "skimming" of videos the way people "skim" books, for example. For instance, referring to FIG. 1, interactive system 100 of the present invention includes a subsystem 120 that allows for such "skimming", and which comprises reliable hardware and software components that allow a user to skim a video, the way another person would "skim" a book. When a person skims a book, that person typically may read only the first sentence of each paragraph. When skimming a book or other written material, the user is not necessarily reading each and every word. In a similar manner, the subsystem 120 allows a user to skim through a video in such a manner that they are not necessarily listening to each and every audible term, and they are not necessarily viewing each and every separate frame of the video. The user can select the speed at which they "skim" a video. The subsystem 120 can preferably include a video speed controller, that enables a user to speed up or fast-forward, slow down, and rewind any video at any desired speed.

The present invention also contemplates computer methods that allow a user of the system 100 to edit a document online as the user views a streaming video. For example, as a user of the interactive law-related content watches a video, a user can scroll through a document, while enabling editing of that document and vice versa. These editing functions can be performed, for example, by editing subsystem 130, as part of the interactive system 100. Editing subsystem 130 comprises reliable hardware and software components that enable a user to edit a document online as the user views a streaming video. The editing subsystem 130 also allows a user to create a new document, add new content to an existing document, or edit or delete content from an existing document. All of the edits can be stored in memory storage, so that the user can save the edited document and continue to work on the document at a later time.

In certain other preferred embodiments, when a user is watching a law-related video, a hand-held computer mouse is used by the user to scroll down the screen during the video. In such a manner, the user can control which part of the video they want to watch, and either fast-forward or rewind the video based on the user's preferences. For example, the user can select when to start a video and when to fast-forward a video by operating the computer mouse. The present invention also provides capabilities for a user to rewind and simultaneously scroll through an online document while viewing a streaming video. These functions can be performed by a user by virtue of a video scrolling subsystem 140. For instance, referring to FIG. 1, interactive system 100 of the present invention includes a video scrolling subsystem 140, which comprises reliable hardware and software components that enable a user to scroll through a video, and either fast-forward or rewind the video based on the user's preferences.

In certain other preferred embodiments, the invention disclosed herein also provides novel methods and systems for aggregating law-related content, including third-party law-related content. For instance, referring to FIG. 1, interactive system 100 of the present invention includes a content aggregation subsystem 150, which comprises reliable hardware and software components for the aggregation of law-related content. According to one example, law-related questions from one or more users, in addition to law-related content, are uploaded by one or more attorneys in response to user-generated questions and requests for information. The automated methods of the present invention, for aggregating law-related content, include methods for automated content aggregation. This automated content aggregation can be reliably implemented, for example, by any suitable content aggregation software. The law-related content can include, but is not limited to, for example, text, videos, images, sounds, and any other forms of audio and/or visual images, graphics, and/or other forms of content. According to a preferred embodiment, the online systems embodied by the present invention provide novel and non-obvious automated methods for aggregating user-generated law-related content, wherein the content comprises content in more than one different language. Any type of method and system for content aggregation can be used including, for instance, "single stream" aggregation methods which aggregate information from multiple sources and combines the information into a single stream of information. A meme aggregator can also be used to reduce the signal to noise ratio and thus aggregate only certain selected content. Similarly, edited aggregation can be used whereby information, e.g. law-related content and questions and answers from one or more users, is aggregated and then edited by one or more editors before it is posted on and made accessible for viewing by users via the interactive system 100.

In one embodiment, the content aggregation subsystem 150 enables automated aggregation of questions and answers about a law-related topic or about a plurality of different law-related topics. These questions and answers can be compiled and stored and retrieved in any desired manner, for instance, by date, user name, topic, etc. A user of the system 100 can also search the aggregated content for text, videos, images, sounds, and any other forms of audio and/or visual images, graphics, and/or other forms of content.

In a preferred embodiment, a user submits a question and the question is posted online using the interactive system 100. The answers to the user's questions are then posted by lawyers that have been selected to participate and approved to provide the answers.

In a preferred embodiment, the interactive system 100 can be accessed using one or more devices (such as, for example, an electronic device, computer, tablet, smartphone, or wireless device) that allows a user to access online delivery of law-related content, educational content, and law-related content presented in an educational and entertaining manner.

When the interactive system 100 allows a user to access online law-related content, the interactive, system 100 will not in any way be deemed or construed to be a law firm, and it will not in any way be deemed to be a platform for providing any kind of legal advice, explanation, opinion, or legal recommendations. The law-related content will simply be for educational and entertaining value for the user. When the interactive system 100 is used, none of the lawyers that act as video instructors and provide answers to a user's questions will require a retainer for discussing the law-related content.

In other preferred embodiments, when the interactive system 100 is used, the system 100 may provide a status update regarding a user's outstanding question(s), etc. However, in no instance will the status updates or answers to a user's questions be deemed as legal advice.

In a preferred embodiment, a user will pay a fee (for instance, using a secure, online payment system) to access one or more videos that are provided via the interactive system 100. Because the interactive system 100 is not a legal services provider, the payment of the fee will not be used for obtaining legal services. Instead, the payment of the fee will be required for a user to access one or more videos that provide law-related content and which are presented in an educational and entertaining manner via the system 100. A user can also select from various subscription plans in order to use the various features of the interactive system 100. For instance, a user can access the interactive system 100 after the user has paid his or her monthly dues to become a subscriber. In this manner, the payment is for the subscription so that a user can access the information provided by the videos, and it is not a payment for any legal representation or advice. Use of the interactive system 100 does not require payment of a retainer for the hiring of an attorney, since legal services are not being provided by the interactive system 100.

In another preferred embodiment, the interactive system 100 provides access to one or more videos that feature one or more attorney "video instructors" along with one or more mock clients. The videos feature entertaining and educational dialogue between these "video instructors" along with one or more mock clients. In a preferred embodiment, the "video instructors" create their own script and author the content of the video. A user can scroll through a video, search for audio content, skim a video, and utilize other features of the system 100 as described herein.

The foregoing description of certain representative embodiments of the present invention have been presented for purposes of illustration and description. They are not intended to be exhaustive or to limit the present invention to the precise forms disclosed. Although specific embodiments have been illustrated and described herein, a variety of alternate and/or equivalent implementations may be substituted for the specific embodiments shown and described without departing from the scope of the present invention. This application is intended to cover any adaptations or variations of the embodiments discussed herein.

What is claimed is:

1. An interactive system comprising at least one electronic device for providing online delivery of one or more videos comprising law-related content, informational content or entertainment-related content, wherein the system enables a user to search the one or more videos for text, audio content, graphics and images, skim the video, scroll through the video, or any combination thereof, wherein the user receives access to the law-related content, informational content or entertainment-related content by paying a subscription fee;

further wherein the interactive system comprises a browse audio or search audio button or tab which is displayed when the user launches the system on the at least one electronic device, wherein the browse audio or search audio button or tab enables the user to browse the one or more videos for one or more audible terms, further wherein the law-related content, informational content or entertainment-related content comprises a dialogue between one or more video instructors and one or more mock clients, and further wherein the dialogue has been scripted and contains jokes as part of the dialogue, while at the same time providing informational law-related content that is helpful in answering the user's law-related questions, further wherein the interactive system comprises hardware components that together provides the user with access to graphics, videos, the law-related content, the informational content or the entertainment-related content, and other visual and audio content, and further wherein the hardware components comprise a sound card, graphic cards, and computer data storage, and further wherein the system comprises one or more of a searching subsystem, an editing subsystem, a video scrolling subsystem, and a content aggregation subsystem, or any combination thereof, wherein the content aggregation subsystem provides automated content aggregation of law-related content comprising text, videos, images, sounds, graphics, or any combination thereof, further wherein the law-related content comprises content in at least one or more different languages, further comprising audio mining search technology to locate certain words, phrases and other audible terms within the law-related content, informational content or entertainment-related content, further comprising search engine technology that enables the user to search a video for audio content comprising an audio file, length and duration of the audio file, voice characteristics of a specific individual, frequency, pitch, loudness, harmonics, and tone, or any combination thereof, further wherein the interactive system provides the user with access to an Internet website via a computer, laptop, tablet, smartphone, or other electronic device, further wherein the computer or other electronic device has a screen and a keyboard, further wherein the keyboard is a physical keyboard or a keyboard that is accessed via touching the screen which allows the user to use the interactive system by touching the screen with their fingers or a stylus;

further wherein the interactive system provides the user with access to legal news updates, access to a calendar of events for law-related, informational and entertaining events, access to sample legal documents, access to a user chat room for exchanging comments and dialogue with other users of the interactive system, access to advertising by real-world attorneys and businesses, and access to movies that feature actors or actresses acting as lawyers, further comprising a microphone and accompanying hardware and software components that allow the user to record his or her own audio input which can be transcribed and allows the user to post law-related questions to one or more video instructors.

2. The interactive system of claim 1, further comprising one or more speakers, and accompanying hardware and software components that allow a user to listen to audible components from a video.

* * * * *